United States Patent [19]

Kluting

[11] 4,223,946
[45] Sep. 23, 1980

[54] VEHICLE SEAT FITTING

[75] Inventor: Bernd A. Kluting, Radevormwald, Fed. Rep. of Germany

[73] Assignee: Keiper Automobiltechnik GmbH & Co. KG, Remscheid, Fed. Rep. of Germany

[21] Appl. No.: 945,303

[22] Filed: Sep. 25, 1978

[51] Int. Cl.² .............................................. A47C 1/025
[52] U.S. Cl. .................................. 297/363; 297/367; 297/379
[58] Field of Search ................................ 297/366–369, 297/379, 378, 354, 355, 363–365, 216; 16/139, 146

[56] References Cited

U.S. PATENT DOCUMENTS

| 2,873,794 | 2/1959 | Leslie et al. | 297/379 |
| 3,481,646 | 12/1969 | Tabor | 297/374 X |
| 3,736,025 | 5/1973 | Ziegler et al. | 297/379 X |
| 3,902,757 | 9/1975 | Yoshimura | 297/367 |
| 3,973,288 | 8/1976 | Pickles | 297/379 X |
| 4,103,970 | 8/1978 | Homier | 297/379 X |

FOREIGN PATENT DOCUMENTS

| 2364755 | 8/1974 | Fed. Rep. of Germany | 297/367 |
| 2459070 | 6/1975 | Fed. Rep. of Germany | 297/366 |
| 2641587 | 3/1978 | Fed. Rep. of Germany | 297/379 |
| 2655535 | 6/1978 | Fed. Rep. of Germany | 297/379 |
| 1358783 | 7/1974 | United Kingdom | 297/366 |

Primary Examiner—William E. Lyddane

[57] ABSTRACT

A hinge fitting for automotive vehicle seats combining the features of small increment recliner adjustment for the backrest, forward tilting of the backrest without release of the adjustment mechanism, and inertia latch means to prevent forward seat tilting under predetermined conditions of vehicle deceleration while permitting free forward tilting when the vehicle is stationary.

10 Claims, 12 Drawing Figures

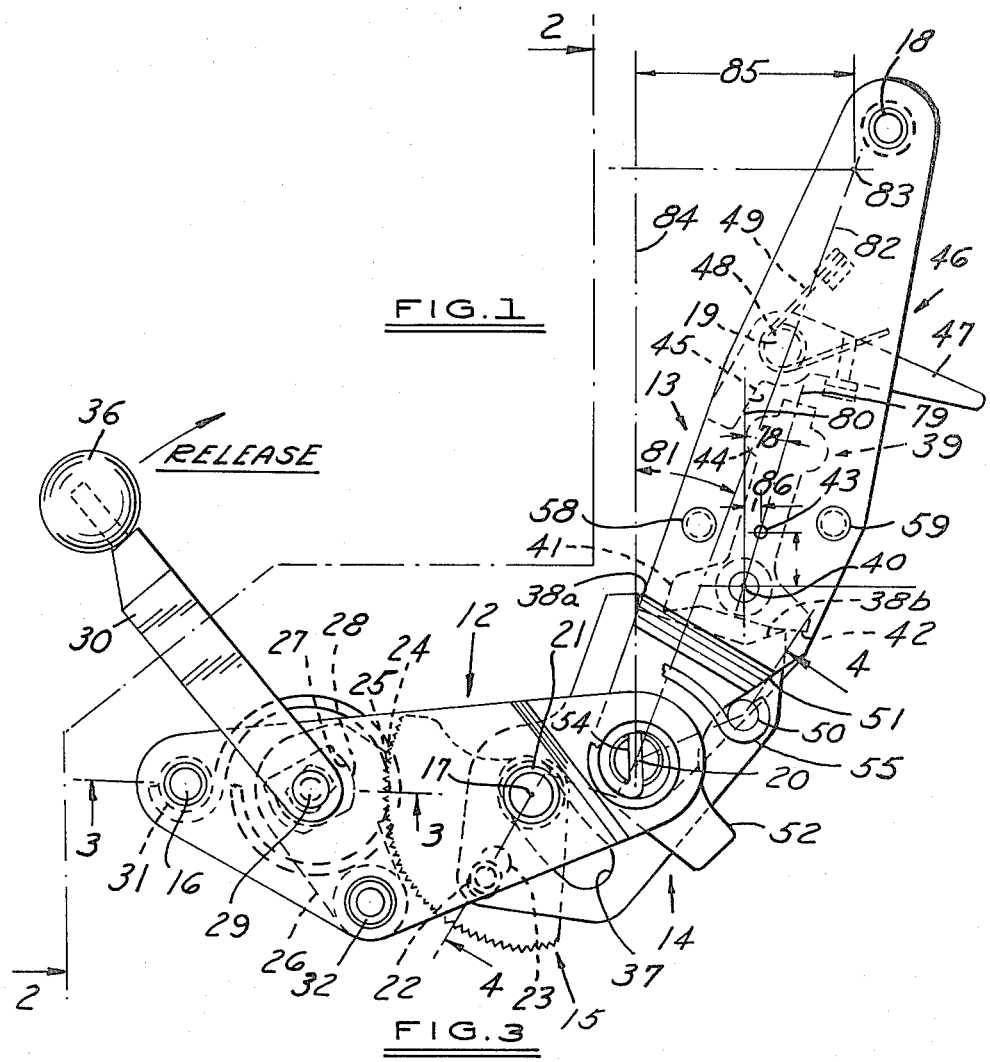
FIG.1
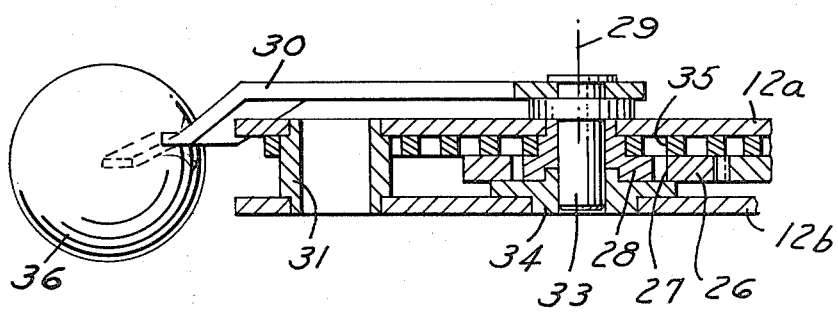

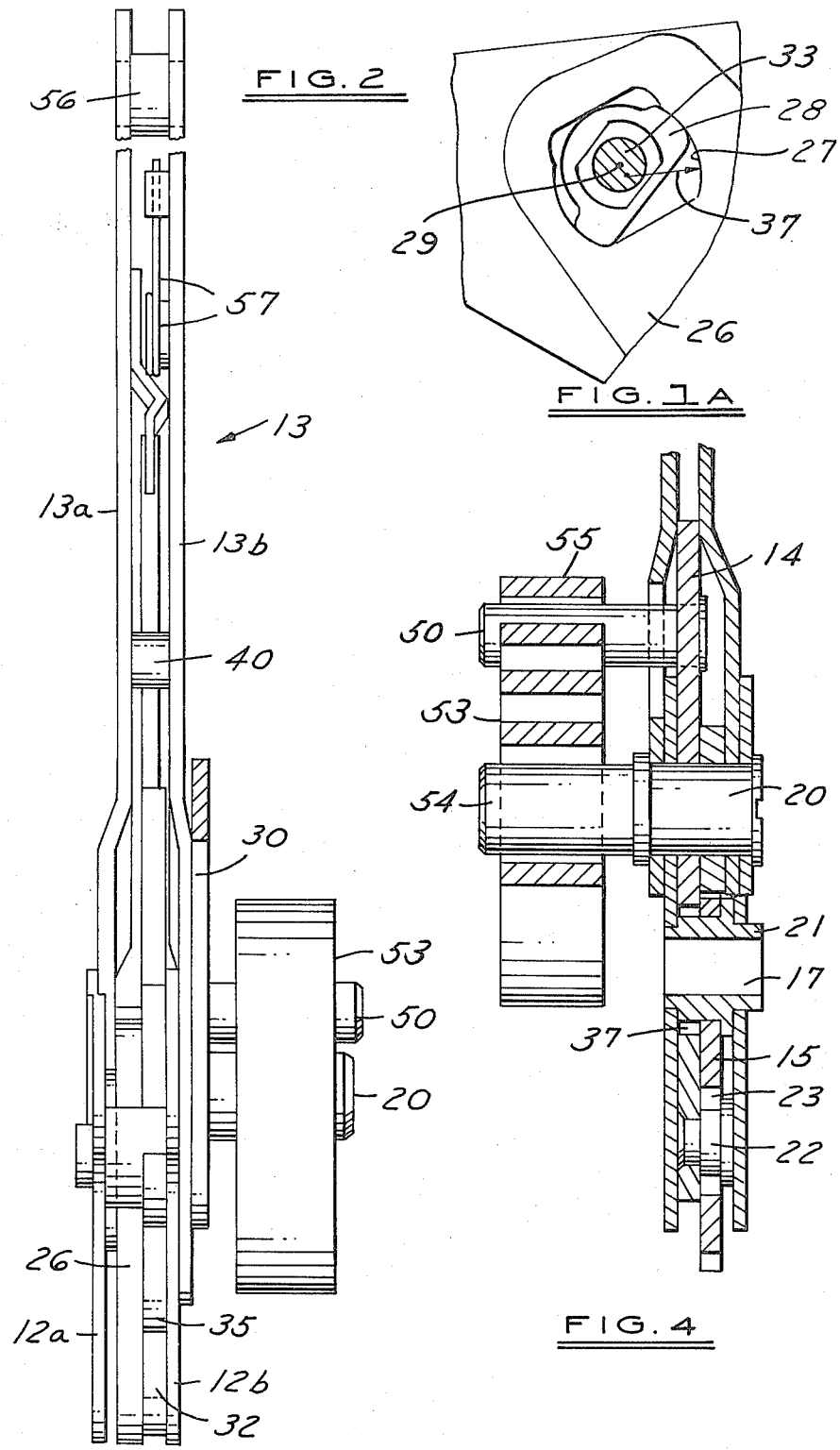

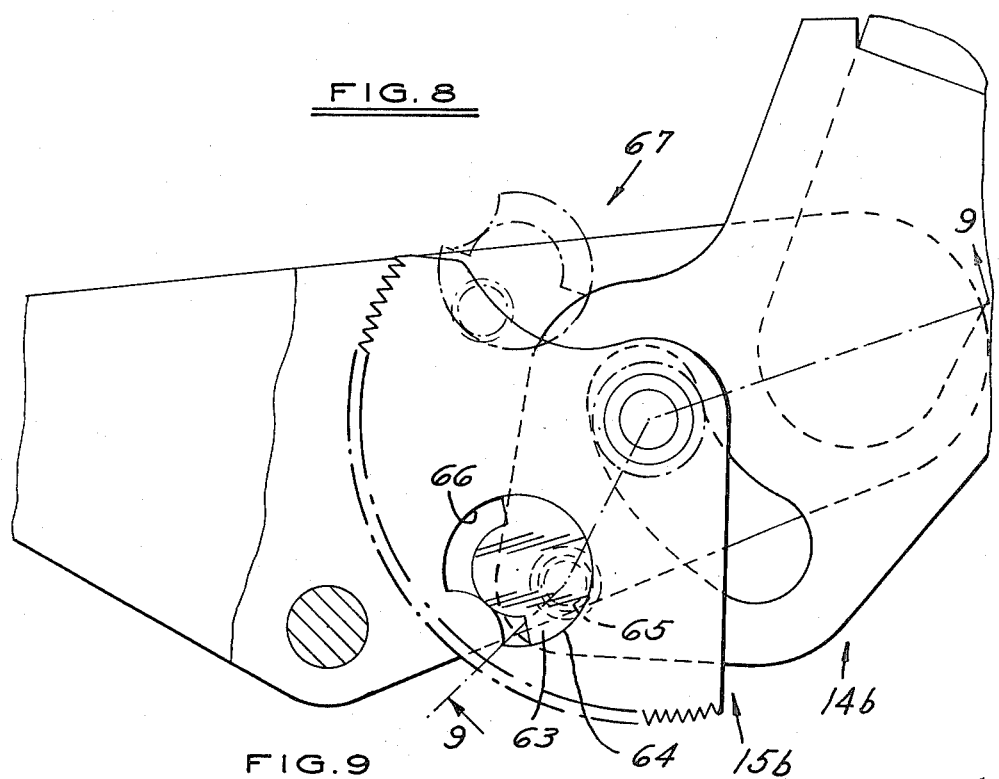
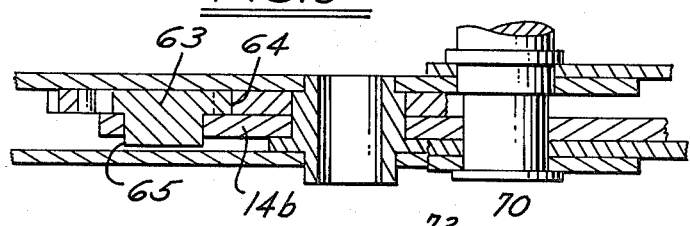
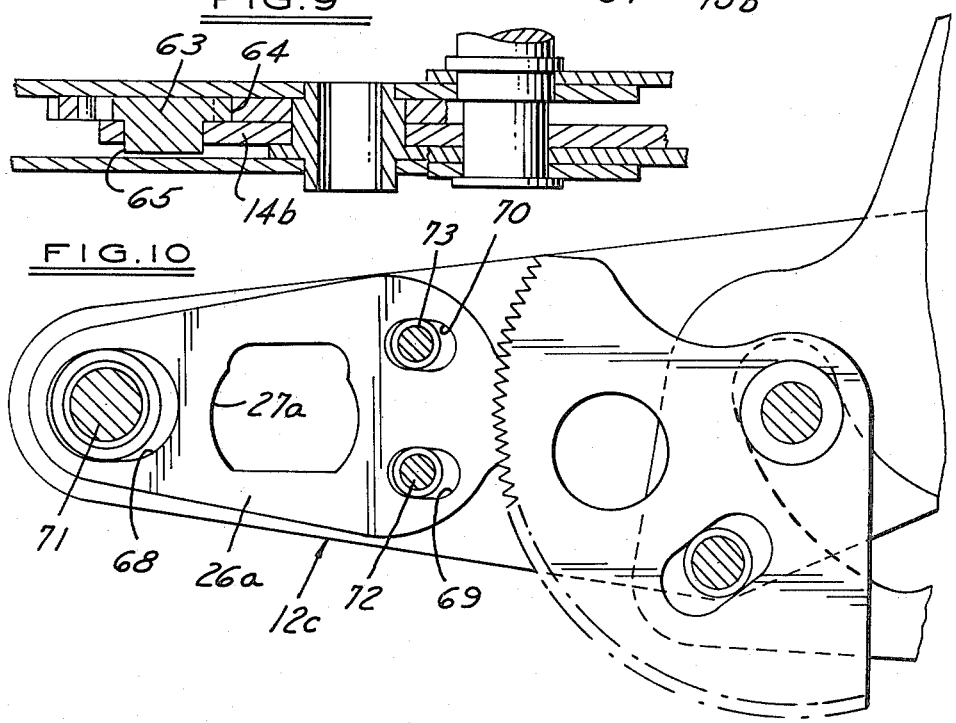

VEHICLE SEAT FITTING

BACKGROUND OF THE INVENTION

It is known in the art to achieve a fine small increment adjustment of a seat recliner employing toothed sector and pawl locking means by a differential translation drive of the toothed sector involving mechanical disadvantage resulting in multiplied arcuate movement of the toothed sector for a given angular movement of the backrest. Examples of patents disclosing such mechanism are British Pat. No. 1,325,509 and U.S. Pat. No. 3,902,757. However, such prior adjustable hinge constructions involve the requirement for releasing the adjustment mechanism to accommodate forward tilting of the backrest and consequently readjustment to a desired angular position of the backrest following each passenger exit and entrance to the rear seat of a two-door passenger car.

Inertia latches are also known to accommodate forward tilting of a backrest without requirement for manual latch release when the vehicle is stationary while blocking such forward tilting under conditions of severe braking or impact from front end collision. Examples of such inertia devices are U.S. Pat. Nos. 2,873,794, 3,433,524 and 3,628,831. However, such patents do not teach the problem or solution for adapting such an inertia latch mechanism to an adjustable recliner seat where the seat angle presents a varying condition for gravity relationships relative to inertia moment arms.

The closest known prior art is a commercially produced construction wherein only a coarse adjustment of sector teeth resulting from direct equal angular displacement with the backrest has the feature of an inertia latch release. Such a hinge fitting has been employed by the Ford Motor Company on certain of its models as an optional feature sold under the "Superlatch" trade name.

SUMMARY OF THE PRESENT INVENTION

Applicant has found it possible through the use of a pivoted locking plate coaxial with the main hinge pivot, capable of angular movement relative to both seat and backrest hinge members, together with a ratchet having an arcuate toothed sector pivotally connected to the seat hinge member, and with a differential translation connection between locking plate and ratchet plate, together with provision of an inertia latch pivotally connected to the backrest hinge member interacting with the locking plate to achieve desired operation under presence or absence of deceleration, to achieve the combined advantages of fine small increment adjustment over a full range of seat recliner accommodation together with automatic release for forward tilting to facilitate rear seat passenger convenience in entering and leaving the vehicle.

BRIEF DESCRIPTION OF THE DRAWINGS

FIG. 1 is a side elevation of a preferred embodiment of applicant's hinge fitting;

FIG. 1a is an enlarged fragmentary sectional view of a handle actuated cam connection shown in FIG. 1;

FIG. 2 is a somewhat enlarged front elevation taken along the line 2—2 of FIG. 1;

FIG. 3 is an enlarged fragmentary sectional view taken along the line 3—3 of FIG. 1;

FIG. 4 is an enlarged fragmentary sectional view taken along the line 4—4 of FIG. 1;

FIG. 8 is a fragmentary side elevation of a modified alternate construction of one portion of the hinge fitting;

FIG. 9 is a fragmentary sectional view taken along the line 9—9 of FIG. 8;

FIG. 10 is a fragmentary side elevation of a further modified alternate construction for a portion of the hinge fitting;

Referring to FIGS. 1 to 4 the preferred embodiment of the present hinge fitting comprises four main interconnected elements including a first seat rest hinge member 12, a second pivotally connected back rest hinge member 13, a locking plate 14, and a ratchet plate 15. The first hinge member 12 is adapted for assembly to a seat rest through apertures 16 and 17. The second hinge member 13 is adapted for assembly to a backrest through apertures 18 and 19. The respective hinge members 12 and 13 are pivotally connected to each other at a main pivot pin 20 which also provides a pivotal mounting for the locking plate 14. The ratchet plate 15 is pivotally connected by a bushing 21 (which provides aperture 17) to the first hinge member 12 and is provided with a differential drive connection with the locking plate through a stud 22 riveted on the locking plate engaging a slot 23 in the ratchet plate 15.

Figure 5:
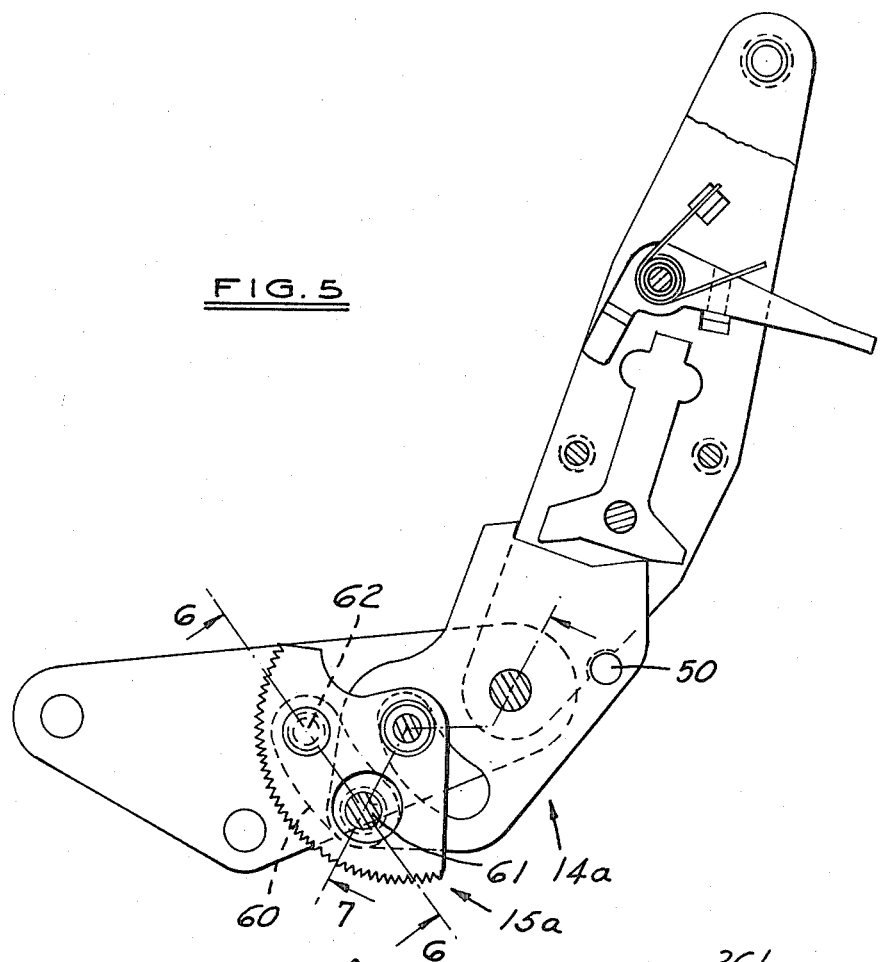
FIG. 5 is a side elevation of a somewhat modified alternate construction.

Ratchet teeth 24 formed on a circular arcuate sector of the ratchet plate are engageable by matching teeth 25 on a pawl 26 pivotally mounted on a bushing 32 to the first hinge member 12. As best shown in FIGS. 1 and 1a a cam opening 27 in the pawl is engaged by an eccentric 28 pivotally mounted on axis 29 to the first hinge member 12 and actuated by handle 30 to a pawl engaging and disengaging position. As best shown in FIG. 3 the hinge member 12 comprises a pair of side plates 12a and 12b joined by spacer bushings 31 and 21 (FIG. 4) at the respective seat connection points 16 and 17 through which seat assembly bolts can pass. The handle 30 is drivingly connected to pin 33 pressed into eccentric 28 and a bushing 34. A coiled spring 35 secured to the eccentric 28 and anchored on the bushing 31 urges the cam 28 and pawl 26 to a normally engaged position which may be overcome by pulling on the handle knob 36. With reference again to FIG. 1a, it will be seen that due to the offset radius 37 for the cam opening 27 from the pivot axis 29, rotation of the handle and pin in a clockwise direction will effect a release of the pawl 26 while manual rotation in a counterclockwise direction with the additional bias of coil spring 35 will lock the eccentric in a pawl engaging position. Pivotal swing of the locking plate 14 about its pivot 20 relative to the ratchet plate mounting bushing 21 is accommodated by a slot 37 and, due to the relatively greater radius between the pivot 20 and drive stud 22 as compared to the radius of the arcuate sector teeth 24 from the pivot bushing 21, a multiplied arcuate movement of the segment teeth 24 will result from any angular travel of the locking plate 14 thus for any given tooth pitch, providing a finer degree of incremental adjustment than could be obtained without such differential translation.

The upper end of the locking plate 14 is provided with a latch surface 38a projecting from a recess extending to an inclined surface 38b adapted to engage inertia latch 39 pivotally mounted at 40 and provided with a latch engaging surface 41 for contact with the locking plate surface 38a and a latch releasing surface 42 normally urged into engagement with the upper extremity of surface 38b by weight of the latch effectively operating at the center of gravity 43. Thus, in normal operation with the vehicle stationary, whenever the seat is moved forward gravity and inertia operating at the center of gravity 43 will cause the surface 42 to remain in engagement with the locking plate and, with resulting pivotal movement of the inertia latch, to prevent the forward latch surface 41 from engaging the locking plate latch surface 38a so that seat back may be moved freely forward to facilitate entrance and exit to and from the rear seat by a vehicle passenger.

On the other hand sudden deceleration of the vehicle through severe braking or collision impact will cause inertia operating on the center of gravity 43 to urge the inertia latch into retaining engagement between the surfaces 38a and 41 so as to prevent the backrest from moving forward. A knob 44 at the upper end of the inertia latch engageable by an arm extension 45 of lever 46 having a handle 47 pivoted at 48 permits manual release of the inertia latch against the bias of spring 49 normally retaining the release lever 47 in an inoperative position.

A pin 50, retained by press fit, extending from the locking plate 14 normally limits the backward travel of the hinge 13 through engagement of hinge surface 51 while forward tilting of the seat is limited by engagement of projection 52 with the pin 50. A coiled spring 53 having one end 54 anchored in an extension of the main pivot pin 20 and the other end 55 engaging an extension of the pin 50 serves to urge the locking plate 14, hinge member 13 and attached backrest to an upright position so as to facilitate adjustment of the toothed sector of the ratchet plate 12 with the handle 30 in release position.

With reference to FIGS. 1 and 2 it will be seen that the hinge member 13 comprises a pair of side plates 13a and 13b connected by bushing 56 providing the aperture 18 and bushing 57 providing the aperture 19 as well as spacer bushings 58 and 59 (omitted from FIG. 2) which serve to rigidly assemble the hinge member with the inertia latch therebetween.

Figure 6:
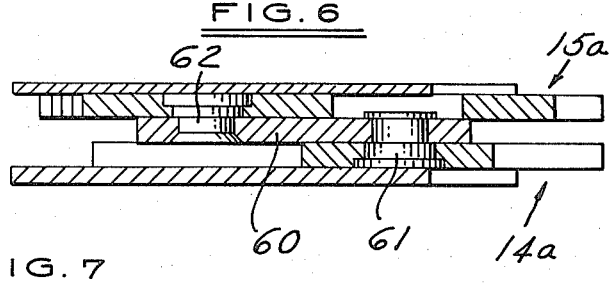
FIG. 6 is a fragmentary sectional view taken along the line 6—6 of FIG. 5.
Figure 7:
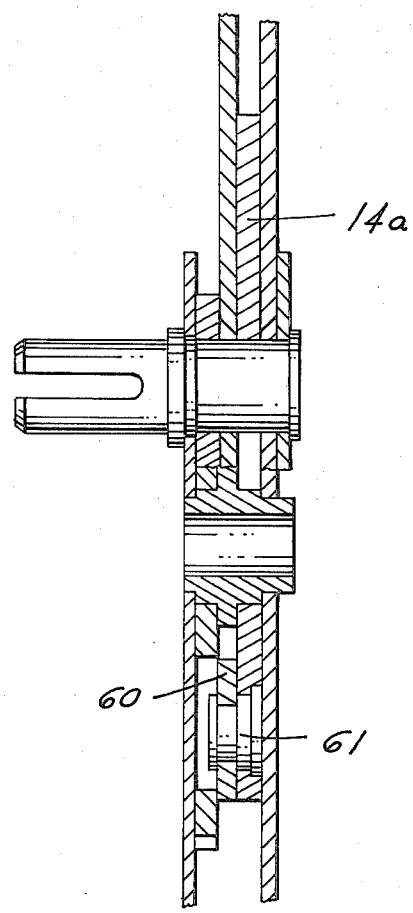
FIG. 7 is a fragmentary sectional view taken along the line 7—7 of FIG. 5.

With reference to FIGS. 5, 6 and 7 a modified construction is shown wherein the link 60 is interposed in the drive connection between locking plate 14a and ratchet plate 15a, such link being attached to the locking plate by a stud pin 61 and the ratchet plate by a stud pin 62 and provides area bearings for the drive connection as distinguished from the line contact involved with the slot 23 in the embodiment of FIGS. 1 to 4. In other respects the hinge fitting is similar to that of the first embodiment and description of the common elements is therefore omitted. Disclosure of the pawl and handle are also omitted for simplicity.

With reference to FIGS. 8 and 9 another alternative construction for the drive connection between locking plate 14b and ratchet plate 15b is disclosed. In this case an eccentric 63 having a circular outer perimeter 64 and an offset drive projection 65 is pivotally connected to the locking plate 14b and, with a circular hole 66 in the ratchet plate, provides area driving contact without resort to an intermediate link as in the case of the embodiment of FIGS. 5 to 7 or the line contact involved with the slot 23 in the FIG. 1–4 embodiment. The eccentric relation of the respective connections to locking and ratchet plates accommodates the differential radius (accommodated by the slot 23 in FIG. 1) throughout the drive stroke with a tiltback position of the respective locking and ratchet plates being shown in phantom at 67.

With reference to FIG. 10 a modification of the pawl 26a is shown which involves a sliding action accommodated by three slots 68, 69 and 70 in the pawl with suitable pin connections at 71, 72 and 73 to the seat hinge 12c with linear movement provided between engaged and disengaged positions through a slot opening 27a in the pawl and an eccentric drive similar to that illustrated in FIG. 1a omitted from the view of FIG. 10. The remaining structure of the hinge fitting is similar to that of the embodiment of FIGS. 1 to 4 and the illustration and description thereof is accordingly omitted.

Figure 11:
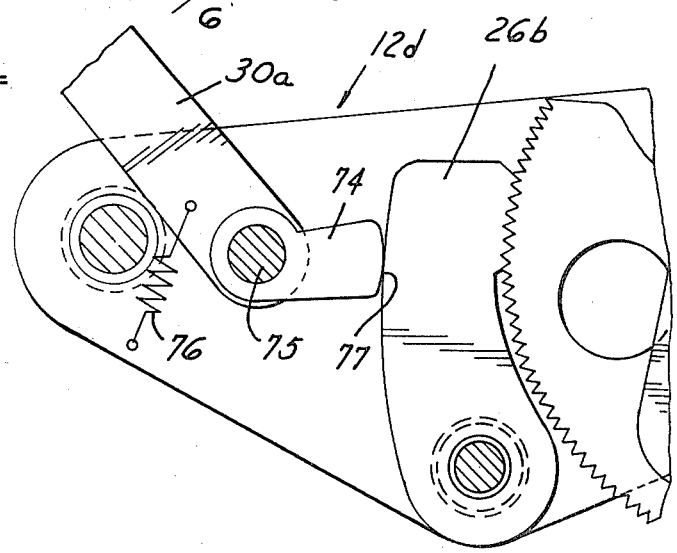
FIG. 11 is a fragmentary side elevation of a further modified alternate construction for a portion of the hinge fitting.

With reference to FIG. 11 a modified construction for locking the pawl 26b in adjusted position is illustrated employing a cam 74, pivotally mounted at 75 to seat hinge fitting 12d, actuated by a handle 30a normally urged to a locking position by tension spring 76. Upon pulling of the handle in a clockwise direction, the cam face 77, having an arcuate radius offset from the center of pivot 75, effects release of the pawl 26b.

Referring again to FIG. 1, it is preferred in order to assure latching under all decelerating conditions which might induce the seat back to tilt forward that the angle 78 between the line 79 joining the latch center of gravity 43 with the center of the latch pivot 40 and the line 80 representing the vertical axis be less than the corresponding angle 81 between the line 82 adjoining the center of gravity 83 of the seat back with the seat back pivot axis 20 and the line 84 representing the vertical axis. Thus, any decelerating force sufficient to overcome the weight of the seat back acting on moment arm 85 to induce forward tilting of the seat back will in every case also be sufficient to overcome the weight of the latch acting on moment arm 86 to cause operative engagement preventing forward seat tilting. It will be understood that if the angle 78 is smaller than the angle 81 for any position of the seat back, it will inherently remain smaller for all adjusted positions.

From the foregoing description of the preferred embodiment and several modifications it will be seen that applicant has provided a hinge fitting for automative vehicle seats which accommodates accurate fine adjustment through a differential translation drive of a ratchet plate toothed sector, automatic free release of the seat back for forward tilting to facilitate rear passenger entrance and exit without any requirement for release of adjustment mechanism combined with automatic inertia latching of the seat back to prevent forward tilting under conditions of severe braking or impact which might otherwise cause the weight of the seat back and rear seat passenger behind same to fly forward.

I claim:
1. A hinge fitting for vehicle seats having a tiltable backrest member comprising a first hinge member connectable to a seat rest member, a second hinge member connectable to a backrest member, a first pivot means connecting said hinge members for relative pivoting movement, a locking plate pivotally mounted on said first pivot means capable of relative pivotal movement to both said first and second hinge members, a ratchet plate having a circular arcuate toothed sector, a second pivot means spaced from said first pivot means connecting said ratchet plate and first hinge member, a differential translation connection between said locking and ratchet plates spaced relatively more from said first pivot means and relatively less from said second pivot means, manually releasable toothed pawl means mounted on said first hinge member for engagement and retention of said toothed sector in any adjusted angular position of said ratchet plate relative to said first hinge member over the full range of operative backrest adjustment, and means for limiting backward movement of said second hinge member relative to said locking plate reflecting the adjusted position of said ratchet plate, said last means accommodating forward tilting movement of said backrest member without pivotal movement of said ratchet and locking plates.

2. A hinge fitting as set forth in claim 1 including releasable means for limiting forward tilting of said backrest member.

3. A hinge fitting as set forth in claim 1 including releasable means for limiting forward tilting of said backrest member, said last means including an automatic inertia latch means adapted to permit forward tilting of said backrest when said vehicle seat is at rest and prevent forward tilting of said seat upon said vehicle seat exceeding a predetermined rate of deceleration.

4. A hinge fitting as set forth in claim 3 including manually operable means for releasing said inertia latch means.

5. A hinge fitting as set forth in claim 1 wherein said differential translation connection comprises interengaging pin and slot means.

6. A hinge fitting as set forth in claim 1 wherein said differential translation connection comprises an intermediate link pivotally connected respectively to said ratchet and locking plates.

7. A hinge fitting as set forth in claim 1 wherein said differential translation connection comprises pivoted eccentric and interengaging arcuate bearing means.

8. A hinge fitting as set forth in claim 1 wherein said pawl means comprises a pawl plate pivotally connected to said first hinge member, a cam opening within said pawl plate, a cam element pivotally mounted on said first hinge member adapted to operate within said cam opening, and a manually operable handle connected to actuate said cam element.

9. A hinge fitting as set forth in claim 1 wherein said pawl means comprises a pawl plate with means slidably mounting it on said first hinge member, a cam opening within said pawl plate, a cam element pivotally mounted on said first hinge member adapted to operate within said cam opening, and a manually operable handle connected to actuate said cam element.

10. A hinge fitting as set forth in claim 1 wherein said pawl means comprises a toothed pawl arm pivotally connected to said first hinge member, a releasable cam pivotally mounted to lockingly engage said pawl arm, and a manually operable handle connected to actuate said cam.

* * * * *